Oct. 20, 1925.

S. R. BROWNE 1,558,143

BALL VALVE AND METHOD OF PRODUCING SAME

Filed Aug. 24, 1922

Inventor
Stewart R. Browne
By
Attorneys

Patented Oct. 20, 1925.

1,558,143

UNITED STATES PATENT OFFICE.

STEWART R. BROWNE, OF BROOKLYN, NEW YORK.

BALL VALVE AND METHOD OF PRODUCING SAME.

Application filed August 24, 1922. Serial No. 583,983.

*To all whom it may concern:*

Be it known that I, STEWART R. BROWNE, a citizen of the United States, residing in the borough of Brooklyn, county of Kings, city and State of New York, have invented certain new and useful Improvements in Ball Valves and Methods of Producing Same, of which the following is a specification.

The present invention relates generally to improvements in valves and is more especially directed to valves of the so-called ball type, which are employed in pumps and similar apparatus.

Heretofore, valves of the specific type referred to have been made of various metals, such as aluminum, brass, zinc, steel, etc., and various metal alloys. They have been of a solid or hollow construction, in some cases being formed by uniting two semi-spheres. Owing to the inherent characteristics of the different metals employed in the production of these valves, and the contraction and expansion thereof, they have been found to be unsatisfactory for the extreme service conditions under which they are designed to operate. For instance, corrosion and catalytic action materially shorten their period of usefulness. The relatively short life of these metal ball valves renders it necessary to make frequent replacements involving not only the expense of providing new valves, but in disassembling the apparatus in which they are used with the consequent loss in service during the time required for making the new installation. Further, in many types of pumping apparatus, such for example as those employed in the oil industry, the tendency of the metal ball valves to vibrate or chatter on their seats and sluggishly respond to the pressure changes, is a serious detriment to the successful and economical operation of the apparatus.

The primary object of the present invention is to provide a ball valve for pumps and other forms of apparatus in which such valves may be used which will overcome the aforesaid disadvantages of the metal ball valves, thereby greatly increasing the efficiency and durability of the apparatus in which my invention is employed.

Another object of my invention is to provide a ball valve having the aforesaid characteristics, which will be of a relatively light construction and will not be affected by those chemical actions which impair the efficiency of, and quickly render useless, the metal types of ball valves.

My invention further comprehends a non-metallic ball valve of a construction which may be readily installed in apparatus designed to employ metal ball valves without altering the construction of such apparatus, or which may be incorporated in new apparatus, and effect a considerable saving in operating cost and maintenance, a valve made in accordance with my invention quickly responding to pressure changes in the apparatus and positively functioning under the most extreme and variable conditions of operation to which valves of the ball type may be subjected in use.

Other objects and advantages of my improved ball valve will present themselves as the description proceeds, and I would have it understood that I reserve unto myself all rights to the full range of equivalents both in structure and uses to which I may be entitled under my invention, as defined by the appended claims.

For the purposes of the present disclosure, I have elected to illustrate and describe one embodiment of my invention and the preferred method of producing the same. My invention, however, may take other forms and the steps in the method of producing the same may be changed or varied without departing from the spirit and scope thereof.

Figure 1:
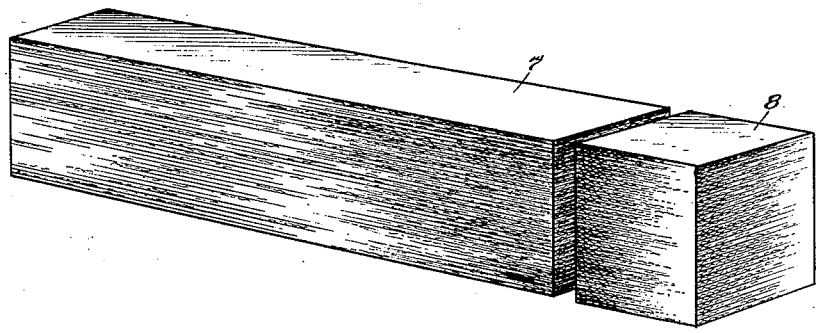
Fig. 1 is a view in perspective of a block section of material from which my improved type of ball valves are produced.

Referring now to the drawings in detail, in which like characters of reference are employed to designate similar parts in the several views, 7 indicates a rectangular block or bar of fibrous material which is preferably built up or composed of a plurality of layers or laminations of cotton duck or the like, united by means of an adhesive substance. For example, in the production of the said bar or block 7, a plurality of sheets of the fibrous material are impregnated with a phenol condensation product or other suitable adhesive substance. They are then super-imposed to produce a pile or stack of the requisite thickness and compacted by a pressure approximating one thousand (1,000) pounds to the square inch, the mass being cured at a temperature of about three hundred (300) degrees Fahrenheit. As the pressure is applied to the material, the adhesive substance exudes from between the laminations sufficiently to provide a continuous coating for the outer edges of the sheets thereby positively preventing the entrance of moisture or fluid between the component layers. This is especially true where the adhesive is a phenolic condensation product which, when submitted to pressure and heat, is transformed into a hard, infusible and relatively insoluble substance.

When the sheets have been made into a homogeneous mass, as just described, the bars or blocks 7 are cut therefrom, these bars or blocks being then subdivided to produce a plurality of cubes 8, each of which is suitable for the production of a single ball valve of a given size or diameter. Obviously, for the production of cubes of different sizes, the number of layers of fibrous material used in making the mass must be increased or decreased, as may be required.

The final operation or step in the method of producing a ball valve according to my invention, consists in turning the cube 8 by any suitable method or mechanism such, for instance, as is employed in the production of billiard balls and similar hard surfaced objects.

Figure 2:
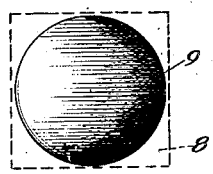
Fig. 2 illustrates a complete valve formed from the material shown in Fig. 1.

To illustrate the dimensions of a cube for a ball of given diameter, I have shown in Fig. 2 a ball 9 which has been turned from a piece or cube of the dimensions of that indicated by the reference numeral 8, the outline of the cube being dotted.

A ball valve made in accordance with my invention may be employed as heretofore set forth, under any and all conditions wherein metallic ball valves of the present types are used. Furthermore, by reason of the extreme hardness of the fabricated material and the fact that it is impervious to moisture and practically immune from injury by extreme temperatures or from chemical action, my improved ball valve in actual practice has been found to function with the most satisfactory results under conditions where the usual metallic ball valves have failed or have proven inefficient.

Figure 3:
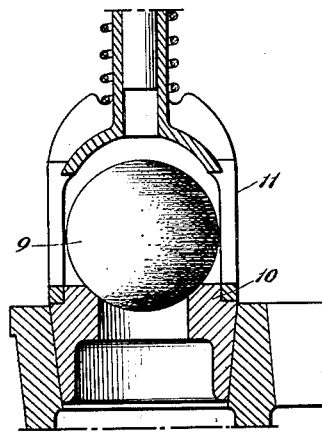
Fig. 3 is a sectional elevation of a valve cage of a pump or similar apparatus showing a valve made in accordance with my invention on its seat within the cage.

An example of installation of my ball valve is shown in Fig. 3, the valve 9 resting upon its seat 10 within the cage or guard 11. It will be noted that the seat 10 is of the usual configuration employed in engineering practice for ball valves so that it will be obvious that my valve is susceptible of use without alteration of any existing form of pumps or apparatus in which the present types of metallic ball valves are now installed. I have also found that a ball valve formed from fibrous material as set forth possesses little, if any, resiliency and hence it has no tendency to vibrate or chatter upon its seat as is the case with metallic valves of the same type.

While I have described my invention with reference to certain specific materials and steps, it will be understood that I do not limit myself to the method of production herein described as it is manifest that the material from which my valve is produced may be made in other ways, my invention being directed to a ball valve produced from fibrous material which is treated to render it extremely hard and not susceptible to those influences which cause rapid deterioration of ball valves of the metallic type.

What is claimed is:

1. A ball valve formed of a material composed of layers of fabric inseparably united under pressure.

2. As an article of manufacture a ball valve formed of a material composed of layers of fabric united by an adhesive substance and subjected to pressure and cured at a temperature to produce a homogeneous mass from which said ball valve is turned.

3. A method of making a ball valve which consists in superimposing a plurality of layers of fabric impregnated with an adhesive substance, then applying pressure thereto and curing at a temperature to inseparably unite said sheets and produce a hard non-resilient material which is impervious to moisture, then cutting from the mass pieces of the requisite dimensions for the formation of a ball from each thereof, and then turning each of said pieces to produce a ball.

4. A ball valve formed from a laminated fibrous material treated to render the same impervious to moisture and resistant to chemical action.

5. A ball valve turned from a cube of material produced by inseparably uniting layers of fabric by the application of pressure and heat thereto.

6. A ball valve for pumps and similar apparatus formed from a block of fibrous material, said material being produced by inseparably uniting a plurality of layers of fibrous material impregnated with an adhesive substance and subjected to pressure and heat.

7. The method of producing ball valves which consists in inseparably uniting a plurality of sheets of fibrous material, cutting blanks therefrom and turning balls from said blanks.

STEWART R. BROWNE.